(12) United States Patent
Kato

(10) Patent No.: US 7,715,118 B2
(45) Date of Patent: May 11, 2010

(54) MACRO LENS SYSTEM

(75) Inventor: Koji Kato, Saitama (JP)

(73) Assignee: Hoya Corporation, Tokyo (JP)

( * ) Notice: Subject to any disclaimer, the term of this patent is extended or adjusted under 35 U.S.C. 154(b) by 222 days.

(21) Appl. No.: 12/062,721

(22) Filed: Apr. 4, 2008

(65) Prior Publication Data

US 2008/0247058 A1    Oct. 9, 2008

(30) Foreign Application Priority Data

Apr. 9, 2007    (JP)    ............... 2007-101302

(51) Int. Cl.
G02B 9/00    (2006.01)
(52) U.S. Cl. ..................... 359/754; 359/791
(58) Field of Classification Search ......... 359/771–773, 359/779–780, 784, 791, 693
See application file for complete search history.

(56) References Cited

U.S. PATENT DOCUMENTS

| | | | |
|---|---|---|---|
| 4,447,137 A | 5/1984 | Aria | |
| 4,923,292 A | 5/1990 | Matsuo | |
| 5,054,899 A | 10/1991 | Yoneyama | |
| 5,170,200 A | 12/1992 | Kawasaki et al. | |
| 5,257,137 A * | 10/1993 | Suzuki et al. | 359/771 |
| 5,592,334 A * | 1/1997 | Oshikiri et al. | 359/689 |
| 5,623,371 A | 4/1997 | Hankawa | |
| 5,790,324 A | 8/1998 | Park | |
| 5,841,590 A * | 11/1998 | Sato | 359/763 |
| 6,091,903 A | 7/2000 | Murata et al. | |
| 6,154,324 A | 11/2000 | Murata et al. | |
| 6,359,739 B1 | 3/2002 | Sensui | |

2005/0141102 A1    6/2005    Arakawa

FOREIGN PATENT DOCUMENTS

| JP | 58-126512 | 7/1983 |
|---|---|---|
| JP | 1-214812 | 8/1989 |
| JP | 2-125220 | 5/1990 |
| JP | 6-130291 | 5/1994 |
| JP | 8-015609 | 1/1996 |
| JP | 10-031153 | 2/1998 |
| JP | 2004-212692 | 7/2004 |

(Continued)

OTHER PUBLICATIONS

English language Abstract of JP 1-214812.

(Continued)

*Primary Examiner*—Jordan M. Schwartz
(74) *Attorney, Agent, or Firm*—Greenblum & Bernstein P.L.C.

(57) ABSTRACT

A macro lens system includes a positive first lens group, a diaphragm, a positive second lens group, and a negative third lens group. Upon focusing from an object at an infinite distance to an object at a closer distance, the positive first lens group and the positive second lens group integrally move toward the object without changing a distance therebetween with respect to the negative third lens group which is stationary with respect to an imaging plane in a camera body. The positive first lens group includes a negative first lens sub-lens group and a positive second sub-lens group which are divided at a maximum distance between lens elements in the positive first lens group. The macro lens system satisfies specified conditions.

9 Claims, 9 Drawing Sheets

FOREIGN PATENT DOCUMENTS

JP         2005-189727         7/2005

OTHER PUBLICATIONS

English language Abstract of JP 2-125220.
English language Abstract of JP 6-130291.
English language Abstract of JP 8-015609.
English language Abstract of JP 10-031153.
English language Abstract of JP 2004-212692.
English language Abstract of JP 2005-189727.
English language Abstract of JP 58-126512.

* cited by examiner

Fig. 1
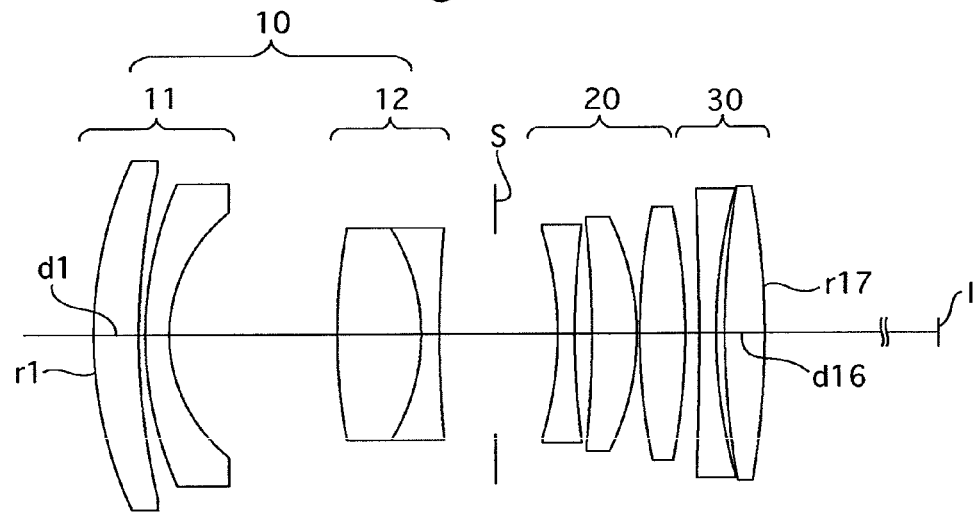
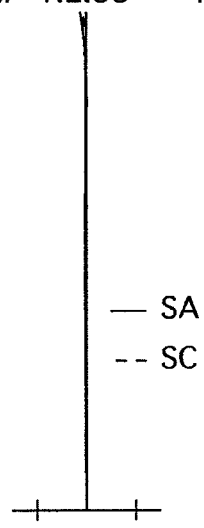
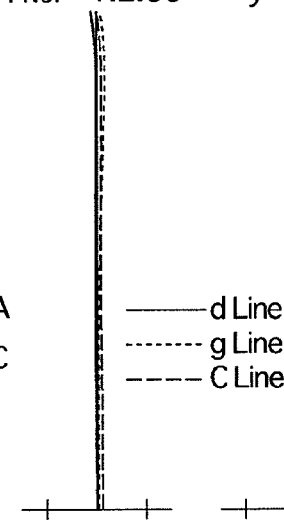
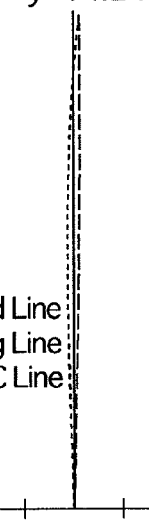
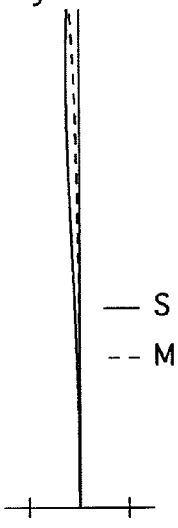
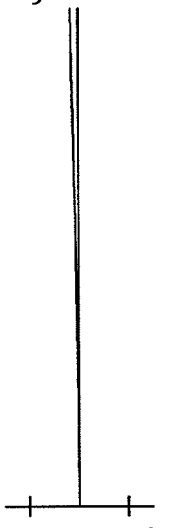

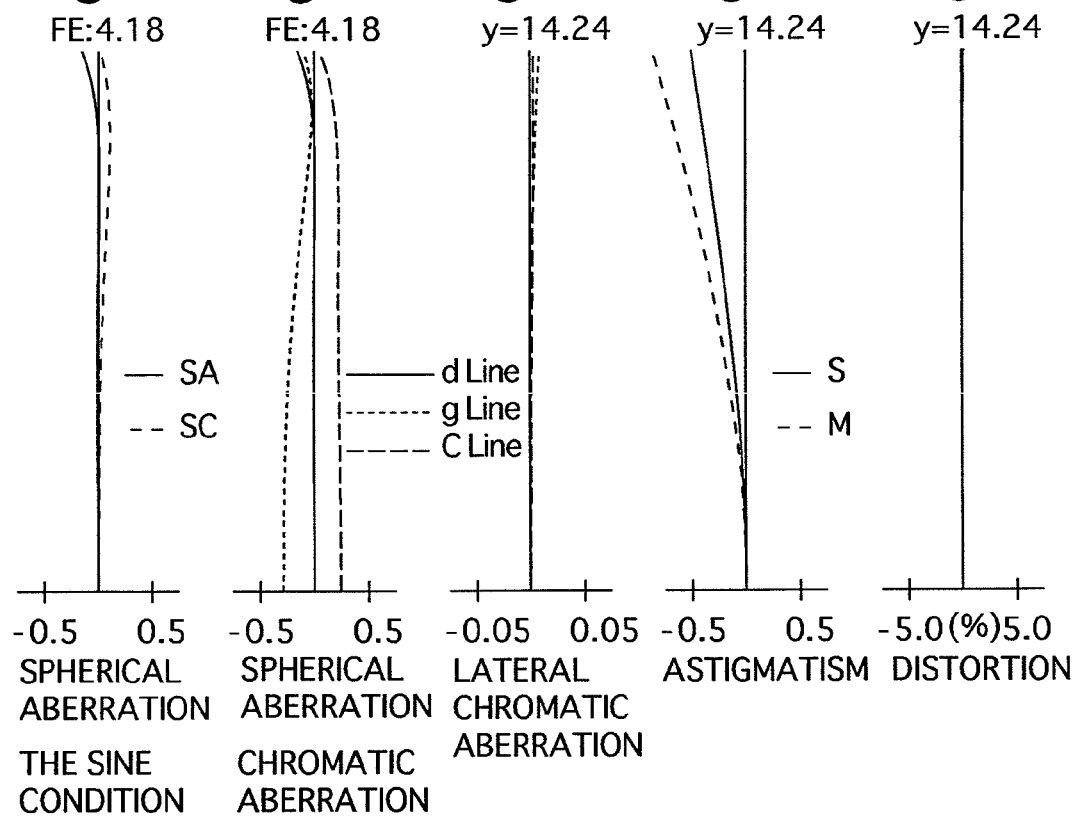
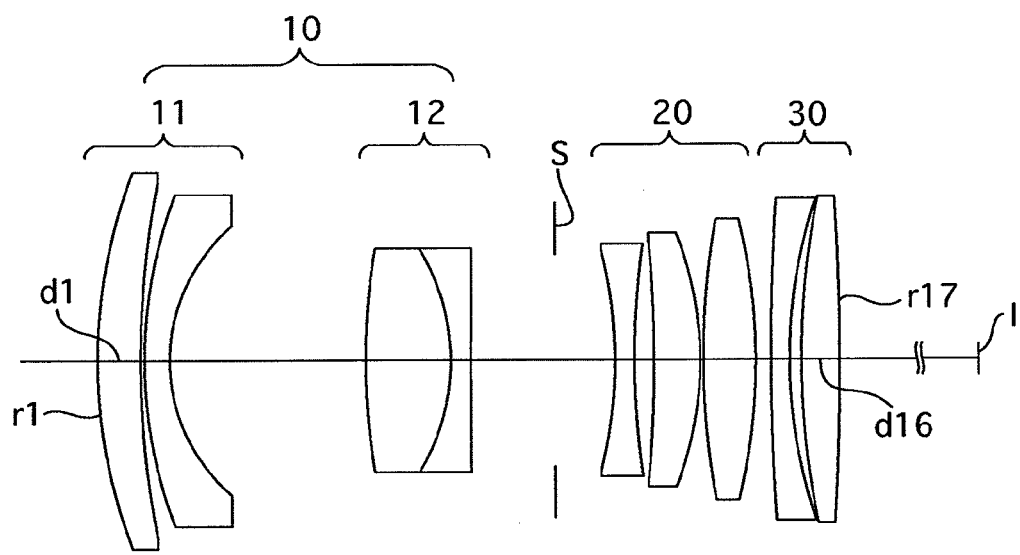

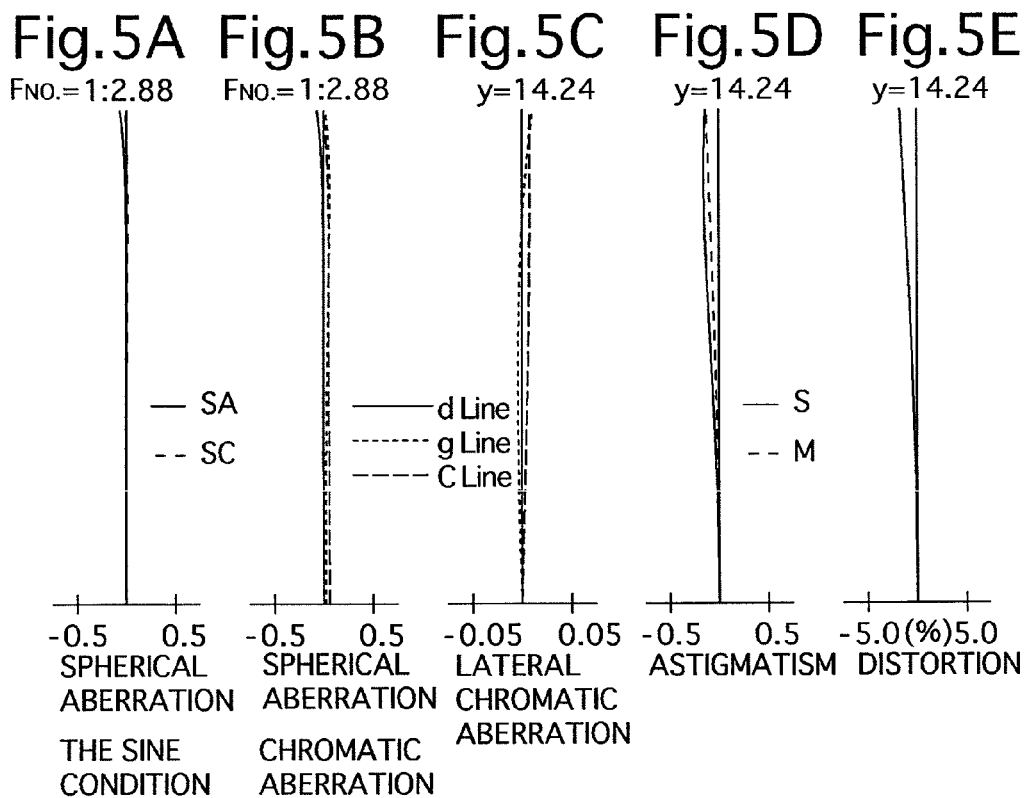
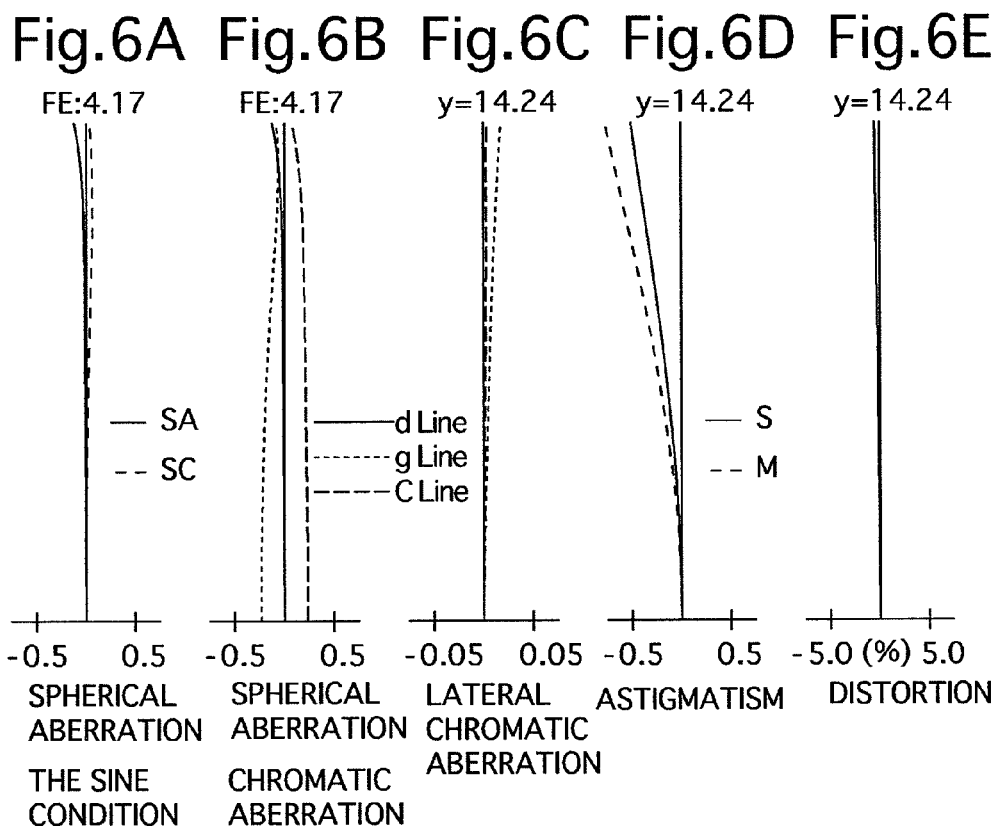

Fig. 7
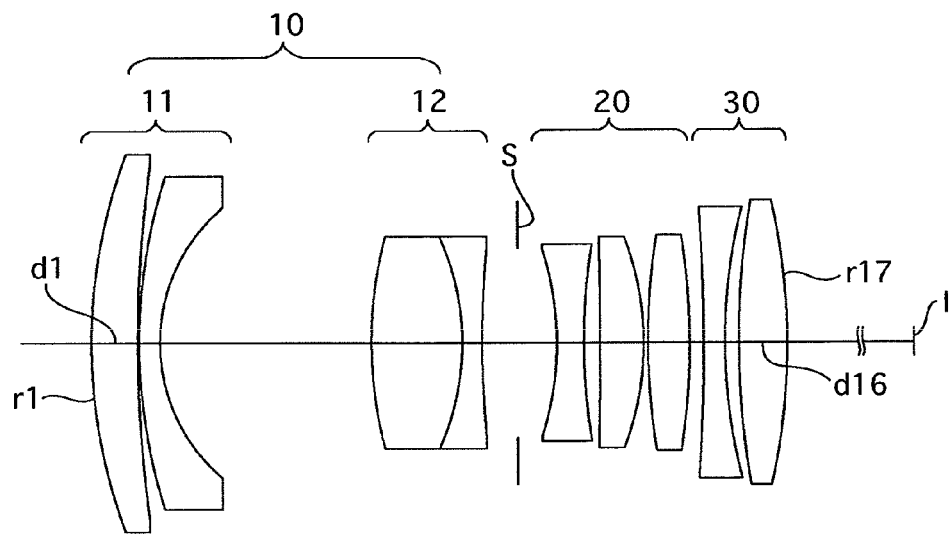
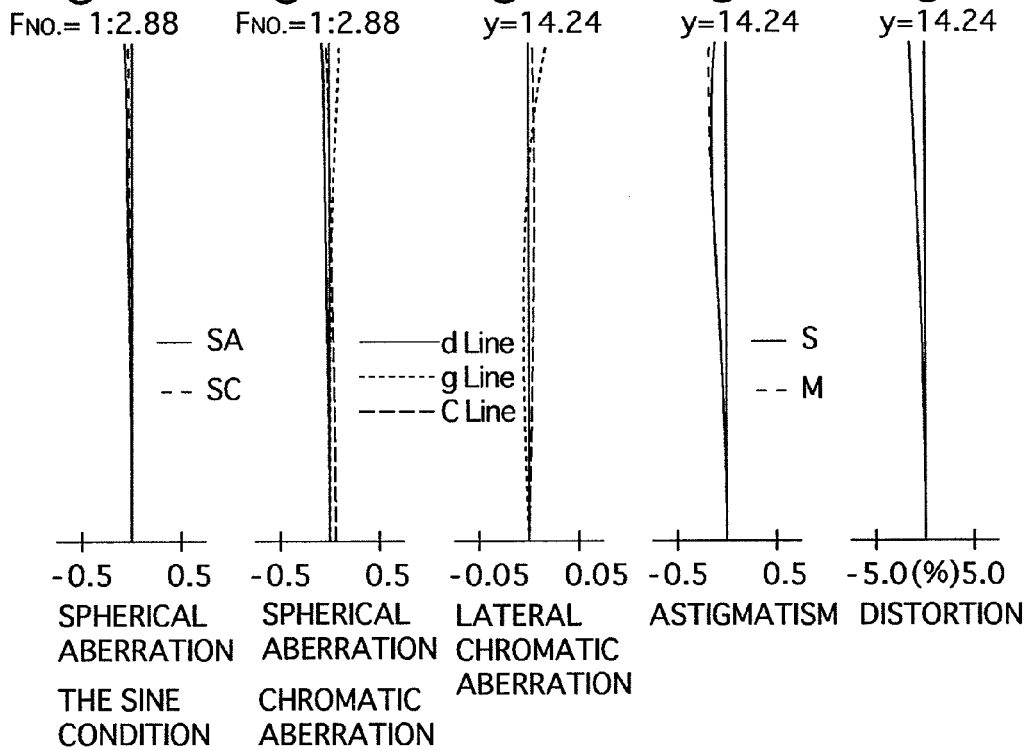

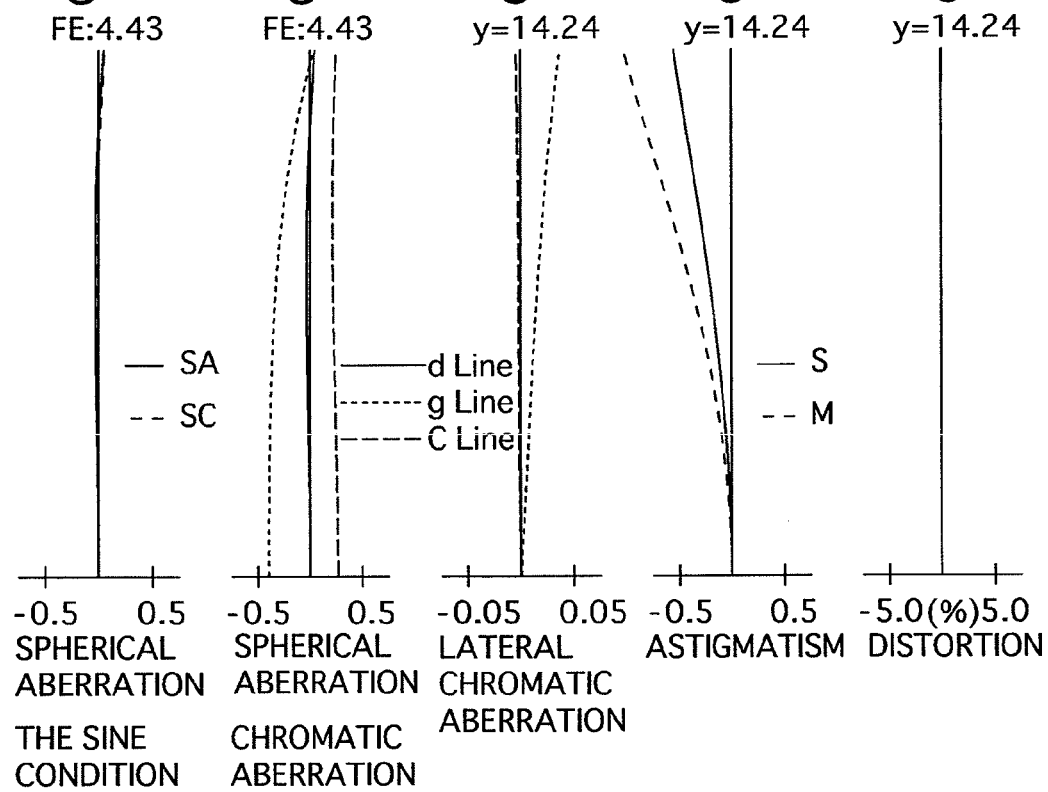
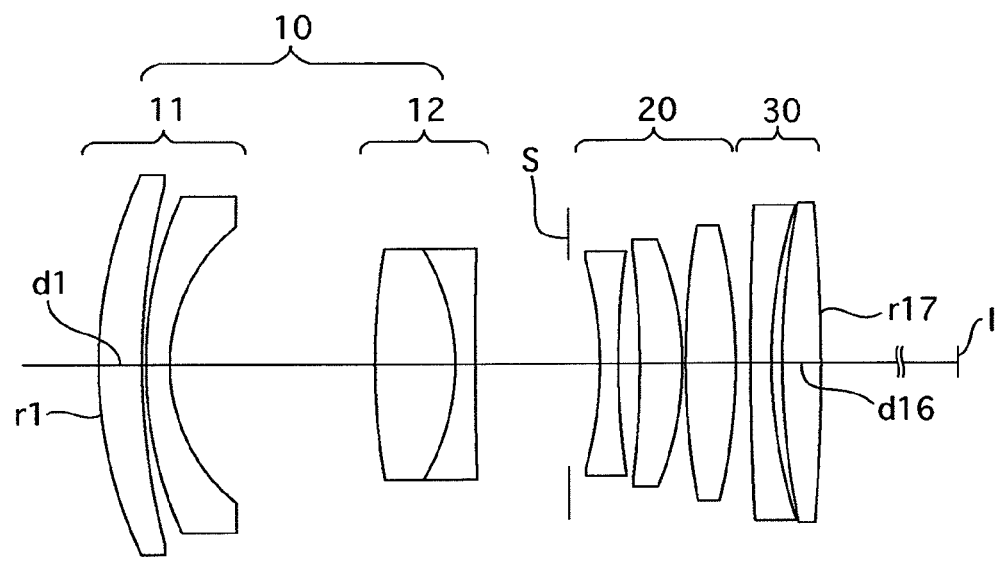

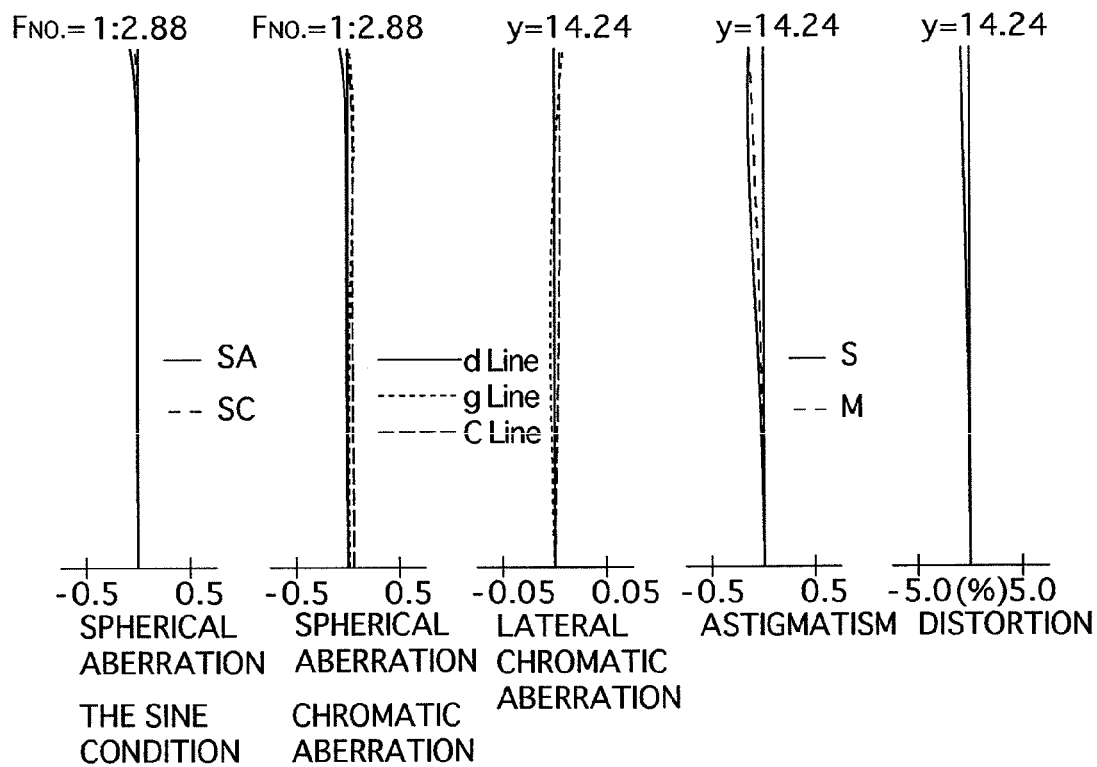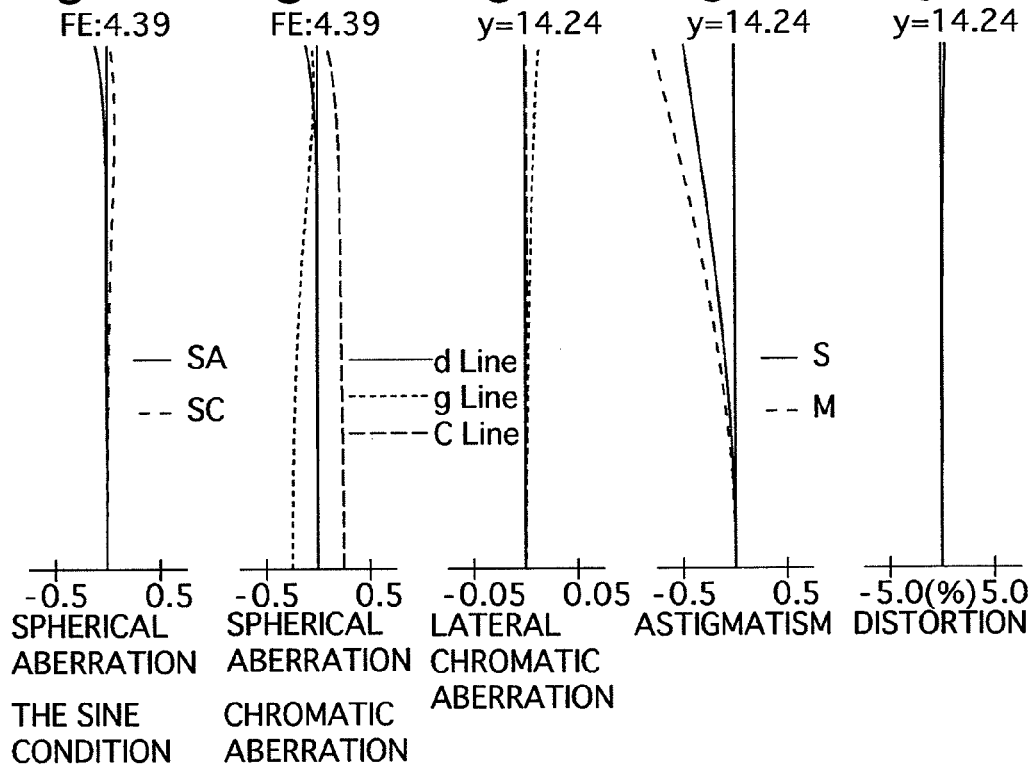

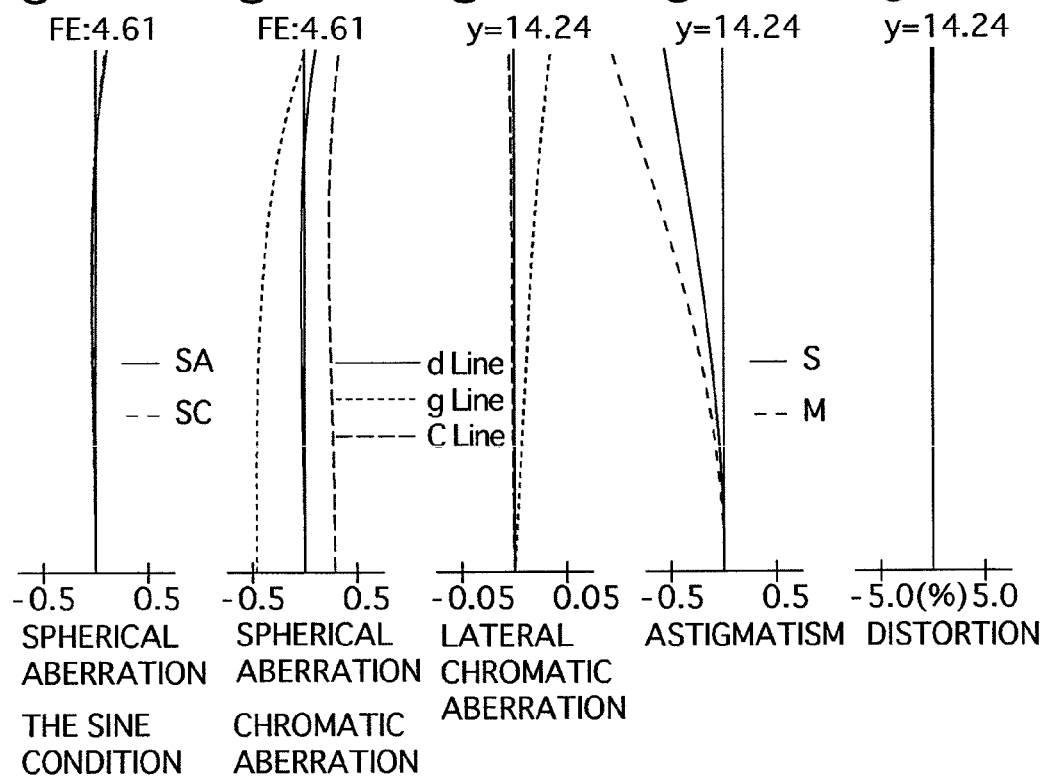
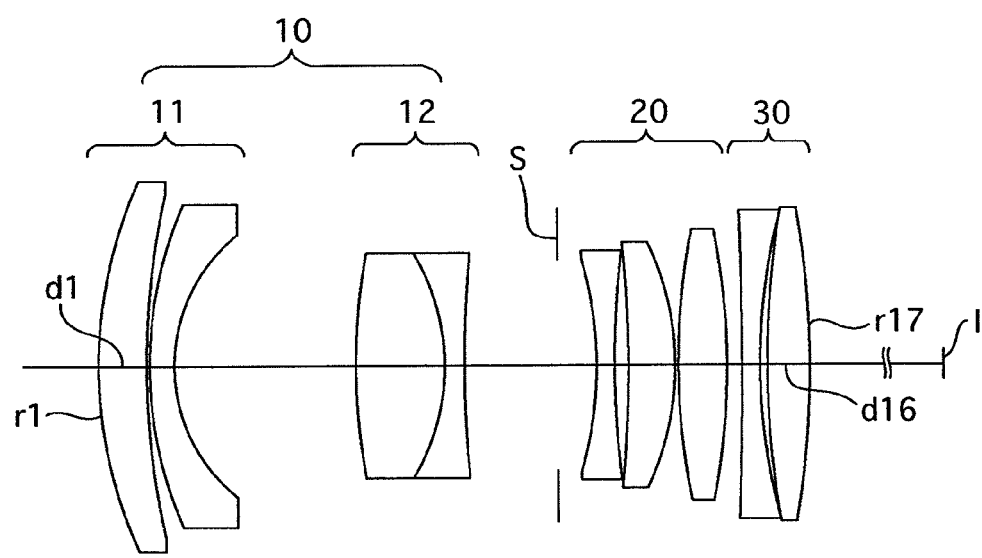

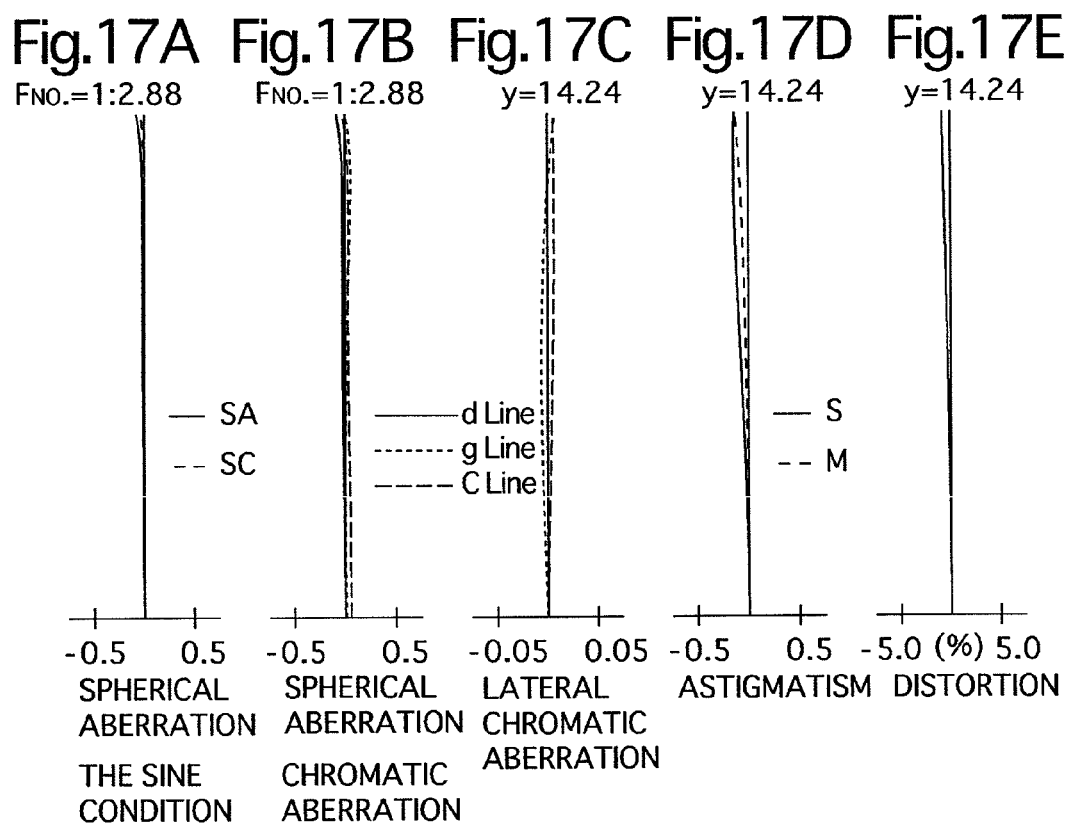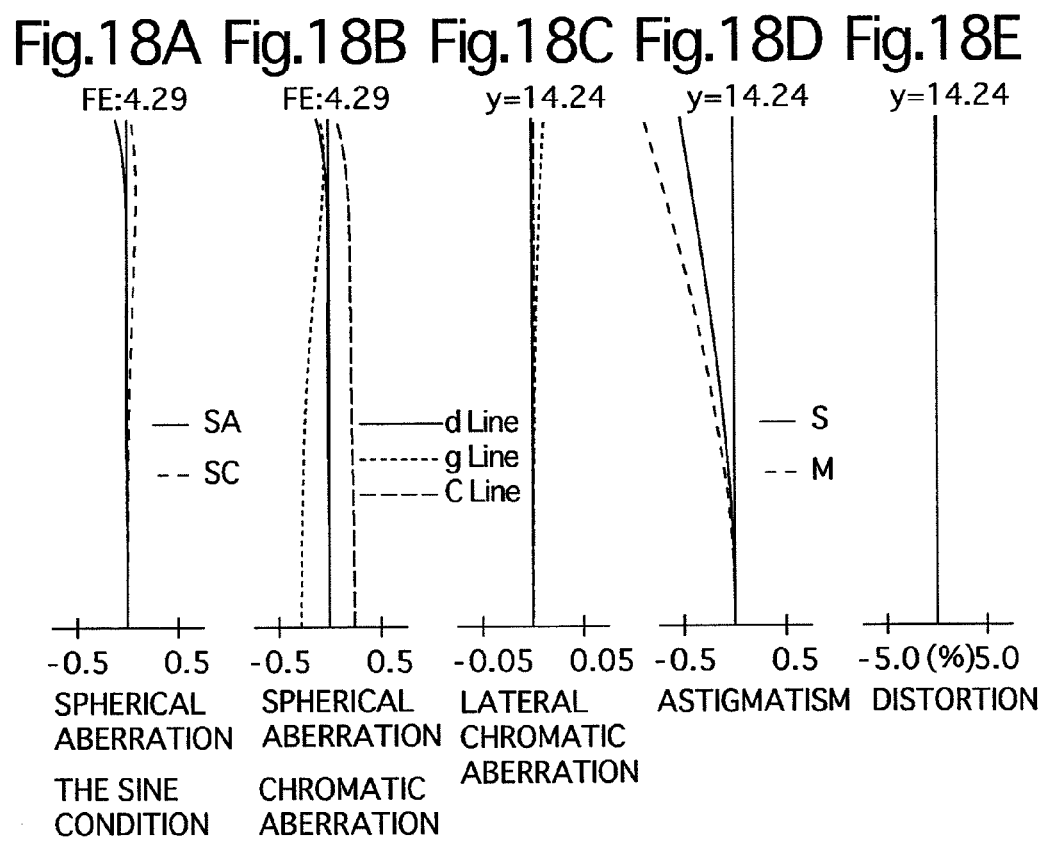

MACRO LENS SYSTEM

BACKGROUND OF THE INVENTION

1. Field of the Invention

The present invention relates to a macro lens system for use in a single-lens reflex (SLR) camera.

2. Description of the Prior Art

In a standard lens system which is not a macro lens system, the correcting of aberrations is carried out based on an infinite distance, and in a macro lens system the correcting of aberrations is carried out based on a closer distance. On the other hand, it has been known that a macro lens system is frequently used for standard photography. It is therefore preferable to achieve a macro lens system in which the correcting of aberrations is suitably carried out from an infinite distance to a closer distance.

In order to meet such demands, there have been three types of prior-art macro lens systems:

First Type Prior Art:

a macro lens system in which the correcting of aberrations is carried out from an infinite distance to a closer distance with a floating mechanism by which focusing is performed by independently moving a plurality of lens groups.

For example, the macro lens systems categorized in the first type prior art are shown in Japanese Unexamined Patent Publication (hereinafter, JUPP) No. H08-15609, JUPP No. 2004-212692 and JUPP No. 2005-189727.

In JUPP No. H08-15609, the macro lens system is divided into four lens groups, and three lens groups thereof are independently movable to correct aberrations from an infinite distance to a closer distance.

In JUPP Nos. 2004-212692 and 2005-189727, the macro lens system is divided into two lens groups, and these two lens groups are independently movable in order to correct aberrations from an infinite distance to a closer distance.

Second Type Prior Art:

A lens system in which the most image-side lens group (final lens group) remains stationary with respect to the imaging plane, and the remaining lens groups provided in front of the final lens group integrally move in order to correct aberrations from an infinite distance to a closer distance (up to about −1/10 magnification).

For example, the lens systems categorized in the second type prior art are shown in JUPP Nos. S58-126512 and H02-125220

Third Type Prior-Art:

A lens system in which the first lens group or the entire lens system is formed as a retro-focus type lens system.

For example, lens systems categorized in the third type prior art are shown in JUPP Nos. H01-214812 and H10-31153.

In JUPP No. H01-214812, the first lens group is formed as a retro-focus type lens group in order to correct aberrations from an infinite distance to a closer distance. In this publication, the macro function is considered.

In JUPP No. H10-31153, the entire lens system is formed as a retro-focus type lens system, in which a positive lens group and a negative lens group are arranged in this order from the object, in order to correct aberrations from an infinite distance to a closer distance. In this publication, the macro function is not considered.

In a macro lens system with the floating mechanism (i.e., the first type prior-art), a problem, such as large variation of aberrations from an infinite distance to a closer distance, is solved; however, the floating mechanism which individually moves a plurality of lens groups is complicated, and tends to be mechanically instable.

In a macro lens system of the second type prior art, only one lens group is movable, or lens groups to be moved are integrally movable as one lens group; and therefore the macro lens system of the second type prior art is mechanically stable.

However, the correcting of aberrations can be carried out up to no more than about −1/10 magnification, and optical quality comes worse when the lens group is advanced to −1/2 magnification or to 1:1 magnification.

In a macro lens system of the third type prior-art, JUPP No. H01-214812 and JUPP No. H10-31153 are explained as follows:

In JUPP No. H01-214812, the first lens group is formed as a retro-focus type lens group, and the entire lens arrangement of the first lens group is to particularly reduce fluctuation of astigmatism from an infinite distance to a closer distance. Consequently, in the first lens group, the difference between the radius of curvature of the object-side surface of the third lens element and that of the image-side surface thereof becomes smaller, so that the Z coefficient which indicates a criterion of easiness/difficulty for centering a lens element is extremely small (i.e., centering is difficult). As a result, the manufacturing costs thereof are undesirably higher.

In JUPP No. H10-31153, the entire lens system is formed as a retro-focus lens system in which the correcting of aberrations is carried out by appropriately distributing the refractive power over the front lens group and the rear lens group. However, if an attempt is made to advance the lens system up to −½ magnification or to 1:1 magnification, the front lens group and the rear lens group collide with each other, and hence it would be mechanically impossible to constitute the entire lens system as a retro-focus lens system.

On the other hand, a digital SLR camera is preferably designed to accommodate not only a photographing lens system exclusively for a digital SLR camera but also a photographing lens system for a conventional silver-halide-film SLR camera. Then, a digital SLR camera has to have a longer flange-back distance as a silver halide film SLR camera has. Accordingly, a photographing lens system exclusive for a digital SLR camera needs to secure a longer back focal distance as that of a silver-halide-film SLR camera.

However, the size of the imaging device of a digital SLR camera is smaller than the frame size of a sliver halide film, so that the focal length of a photographing lens system exclusive for a digital SLR camera has to be made shorter in order to achieve the same angle-of-view as that of photographing lens system for a conventional silver-halide-film SLR camera.

SUMMARY OF THE INVENTION

The present invention is to provide a miniaturized macro lens system (i) which can be used with a digital SLR camera to which a conventional photographing lens system for a silver-halide-film SLR camera can be mounted; (ii) which enables photography at approximately 1:1 magnification, and which (iii) can suitably correct aberrations, particularly spherical aberration and distortion, from an infinite distance to a closer distance.

According to an aspect of the present invention, there is provided a macro lens system including a first lens group having a positive refractive power (hereinafter, a positive first lens group), a diaphragm, a second lens group having a positive refractive power (hereinafter, a positive second lens group), and a third lens group having a negative refractive power (hereinafter, a negative third lens group), in this order from the object.

Upon focusing from an object at an infinite distance to an object at a closer distance, the positive first lens group and the positive second lens group integrally move toward the object without changing a distance therebetween, with respect to the negative third lens group which is stationary with respect to the imaging plane in a camera body.

The positive first lens group includes a negative first sub-lens group and a positive second sub-lens group which are divided at a maximum distance between lens elements in the positive first lens group.

The macro lens system satisfies the following conditions:

$$0.32 < d/f < 0.7 \quad (1)$$

$$-10 < f3/f < -6 \quad (2)$$

wherein d designates an distance between the negative first sub-lens group and the positive second sub-lens group;

f designates a focal length of the entire macro lens system; and f3 designates a focal length of the negative third lens group.

The negative first sub-lens group is preferably constituted by a plurality of lens elements; and the plurality of lens elements include a negative lens element. The rest of said plurality of lens elements are provided on the object-side of the negative lens element; and the rest of the plurality of lens elements comprise at least one positive lens element.

The negative first sub-lens group is preferably constituted by a positive first lens element having a convex surface facing toward the object and a negative second lens element, in this order from the object.

The negative second lens element preferably includes a negative meniscus lens element having the concave surface, with a smaller radius of curvature, facing toward the image.

The positive second sub-lens group preferably includes cemented lens elements having a positive third lens element and a negative fourth lens element, in this order from the object.

The macro lens system preferably satisfies the following conditions:

$$-0.75 < f_{1b-2}/f1a < -0.55 \quad (3)$$

wherein $f_{1b-2}$ designates a combined focal length of the positive second sub-lens group and the positive second lens group; and f1a designates a focal length of the negative first sub-lens group.

The positive second lens group preferably includes a negative biconcave lens element and two positive lens elements, in this order from the object.

More specifically, the positive second lens group preferably includes three lens elements, i.e., a negative biconcave lens element, a positive lens element having a convex surface facing toward the image, and a positive biconvex lens element, in this order from the object.

The negative third lens group preferably includes a negative lens element and a positive biconvex lens element.

The present disclosure relates to subject matter contained in Japanese Patent Application No. 2007-101302 (filed on Apr. 9, 2007) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first embodiment of the macro lens system according to the present invention, when an object at infinity is in an in-focus state;

FIGS. 2A, 2B, 2C, 2D and 2E show various aberrations occurred in the lens arrangement shown in FIG. 1, when an object at infinity is photographed;

FIGS. 3A, 3B, 3C, 3D and 3E show various aberrations occurred in the lens arrangement shown in FIG. 1, when an object at a closer distance is photographed;

FIG. 4 shows a lens arrangement of a second embodiment of the macro lens system according to the present invention, when an object at infinity is in an in-focus state;

FIGS. 5A, 5B, 5C, 5D and 5E show various aberrations occurred in the lens arrangement shown in FIG. 4, when an object at infinity is photographed;

FIGS. 6A, 6B, 6C, 6D and 6E show various aberrations occurred in the lens arrangement shown in FIG. 4, when the object at a closer distance is photographed;

FIG. 7 shows a lens arrangement of a third embodiment of the macro lens system according to the present invention, when an object at infinity is in an in-focus state;

FIGS. 8A, 8B, 8C, 8D and 8E show various aberrations occurred in the lens arrangement shown in FIG. 7, when an object at infinity is photographed;

FIGS. 9A, 9B, 9C, 9D and 9E show various aberrations occurred in the lens arrangement shown in FIG. 7, when the object at a closer distance is photographed;

FIG. 10 shows a lens arrangement of a fourth embodiment of the macro lens system according to the present invention, when an object at infinity is in an in-focus state;

FIGS. 11A, 11B, 11C, 11D and 11E show various aberrations occurred in the lens arrangement shown in FIG. 10, when an object at infinity is photographed;

FIGS. 12A, 12B, 12C, 12D and 12E show various aberrations occurred in the lens arrangement shown in FIG. 10, when the object at a closer distance is photographed;

FIGS. 15A, 15B, 15C, 15D and 15E show various aberrations occurred in the lens arrangement shown in FIG. 13, when an object at a closer distance is photographed;

FIG. 16 shows a lens arrangement of a sixth embodiment of the macro lens system according to the present invention, when an object at infinity is in an in-focus state;

FIGS. 17A, 17B, 17C, 17D and 17E show various aberrations occurred in the lens arrangement shown in FIG. 16, when an object at infinity is photographed; and FIGS. 18A, 18B, 18C, 18D and 18E show various aberrations occurred in the lens arrangement shown in FIG. 16, when the object at a closer distance is photographed.

DESCRIPTION OF THE PREFERRED EMBODIMENTS

Figure 13:
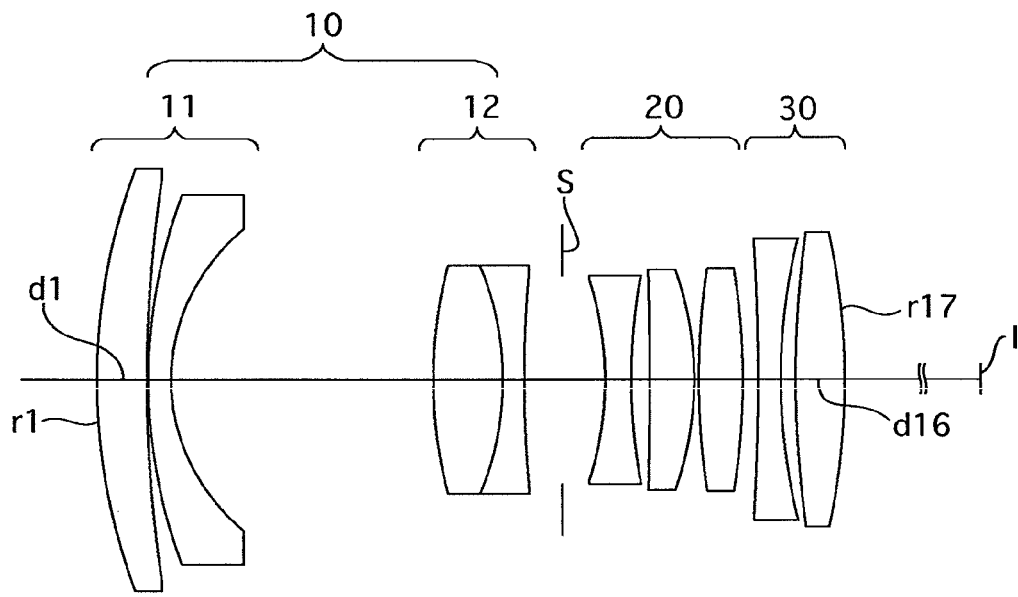
FIG. 13 shows a lens arrangement of a fifth embodiment of the macro lens system according to the present invention, when an object at infinity is in an in-focus state.
Figures 14A, 14B, 14C, 14D, 14E:
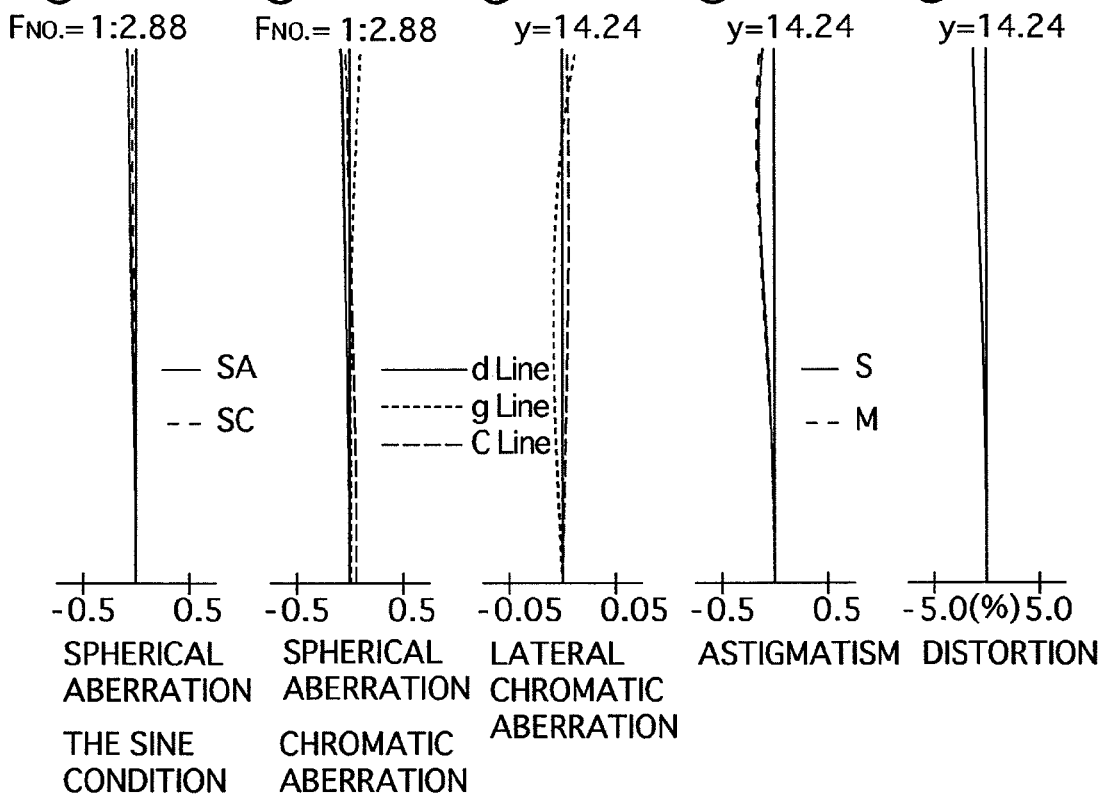
FIGS. 14A, 14B, 14C, 14D and 14E show various aberrations occurred in the lens arrangement shown in FIG. 13, when an object at infinity is photographed.

The macro lens system of the present invention, as shown in FIGS. 1, 4, 7, 10, 13 and 16, includes a positive first lens group 10, a diaphragm S, a positive second lens group 20, and a negative third lens group 30, in this order from the object.

The positive first lens group 10 is divided into a negative first sub-lens group 11 and a positive second sub-lens group 12 at a maximum distance between lens elements in the positive first lens group 10.

The negative third lens group 30 remains stationary with respect to the imaging plane I in a camera body.

Upon focusing from an object at an infinite distance to an object at a closer distance, the positive first lens group 10 and the positive second lens group 20 integrally move toward the object without changing the distance therebetween with respect to the negative third lens group 30 which is stationary with respect to the imaging plane I.

In other words, the negative third lens group 30 does not move during a focusing operation, and is separate from the positive first lens group 10 and the positive second lens group 20 which integrally move during focusing.

The diaphragm S is provided between the positive first lens group 10 and the positive second lens group 20.

Furthermore, as shown FIGS. 1, 4, 7, 10, 13 and 16, with respect to the positive first lens group 10 and the positive second lens group 20, the negative first sub-lens group 11, the positive second sub-lens group 12 and the positive second lens group 20 constitute a retro-focus type lens system. Due to the negative refractive power of the negative first sub-lens group 11, distortion in the negative direction, and spherical aberration largely occur. Therefore the negative first sub-lens group 11 is preferably constituted by a plurality of lens elements; and the plurality of lens elements include a negative lens element. The rest of said plurality of lens elements are provided on the object-side of the negative lens element; and the rest of the plurality of lens elements comprises at least one positive lens element.

In order to reduce the occurrence of distortion, a negative lens element in the negative first sub-lens group 11 is preferably formed as a negative meniscus lens element having the convex surface facing toward the object, and having a relatively smaller radius of curvature (i.e., a relatively stronger negative refractive power).

Namely, even in a lens group having a negative refractive power, such as the negative first sub-lens group 11, a negative lens element having a shape by which distortion in the negative direction can be reduced is preferably provided therein. Moreover, with the above shape of the negative lens element, the distance between the negative lens element and the positive lens element provided on the object-side of the negative lens element can be made shorter, and further miniaturization of the macro lens system can be attained.

The positive second sub-lens group 12 is constituted by a positive lens element and a negative lens element each of which is made from a predetermined glass material, and which are to be cemented to each other so that the combined refractive power is positive. It is preferable that the difference of refractive indices of the grass materials be larger. With such an optical arrangement, spherical aberration is suitably corrected in the positive second sub-lens group 12.

Furthermore, in the case where a relatively thicker positive lens element is employed, distortion can be corrected.

In the retro-focus type lens system including the negative first sub-lens group 11, the positive second sub-lens group 12 and the positive second lens group 20, the refractive power of the rear lens group (i.e., the positive second sub-lens group 12 and the positive second lens group 20) generally becomes too strong, so that spherical aberration tends to largely occur. Therefore in the positive second lens group 20, it is preferable that a biconcave negative lens element be provided in order to reduce spherical aberration Furthermore, in the case where the positive refractive power of the positive second lens group 20 is loaded onto one positive lens element only, the positive refractive power of the positive second lens group 20 becomes too strong. As a result, the correcting of spherical aberration becomes difficult. To overcome such a drawback, two positive lens elements are preferably provided in the positive second lens group 20.

In the embodiments of the present invention, the positive second lens group 20 includes a negative biconcave lens element, a positive lens element having a convex surface facing toward the image, and a positive biconvex lens element, in this order from the object.

The negative third lens group 30 includes two lens elements, i.e., a positive lens element and a negative lens element in this order or vice versa from the object, in order to correct spherical aberration and astigmatism which occur when an object at closer distance is photographed.

Upon focusing from an object at an infinite distance to an object at a closer distance, the positive first lens group 10 and the positive second lens group 20 integrally move toward the object without changing a distance therebetween, with respect to the negative third lens group 30 which is stationary with respect to the imaging plane in a camera body. Due to this arrangement, the traveling distance of the lens groups can be made shorter, the mechanisms for driving the lens groups can be made simpler, and the movement of the lens groups can be stabilized. On the other hand, in the prior art, upon focusing from an object at an infinite distance to an object at a closer distance, focusing is performed by a floating mechanism in which a plurality of lens groups are independently moved through a complicated mechanism for driving the lens groups.

The macro lens system of the present invention preferably satisfies conditions (1), (2) and (3) to be discussed below.

Condition (1) specifies the distance between the negative first sub-lens group 11 and the positive second sub-lens group 12 (the distance between the most image-side surface of the negative first sub-lens group 11 to the most object-side surface of the positive second sub-lens group 12).

If the distance between the negative first sub-lens group 11 and the positive second sub-lens group 12 becomes longer to the extent that d/f exceeds the upper limit of condition (1), the entire macro lens system also becomes longer. Here, if an attempt is made to shorten the entire macro lens system, the distance between the negative first sub-lens group 11 and the positive second sub-lens group 12 becomes too short, so that the correcting of spherical aberration becomes difficult.

If the distance between the negative first sub-lens group 11 and the positive second sub-lens group 12 becomes shorter to the extent that d/f exceeds the lower limit of condition (1), the negative refractive power of the negative first sub-lens group 11 needs to be stronger for the purpose of securing the back focal distance. Consequently, the correcting of aberrations, particularly spherical aberration, becomes difficult in the positive second sub-lens group 12 and the positive second lens group 20 which are positioned behind the negative first sub-lens group 11.

Condition (2) specifies the focal length (the refractive power) of the negative third lens group 30.

In the macro lens system of the present invention, the negative third lens group 30 remains stationary upon focusing with respect to the imaging plane I in a camera body. Due to this arrangement, the correcting of aberrations becomes easier when an object at a closer distance is photographed.

If the refractive power of the negative third lens group 30 becomes stronger, i.e., the focal length thereof is made shorter, to the extent that f3/f exceeds the upper limit of condition (2), the traveling distances of the positive first lens group 10 and the positive second lens group 20 upon focusing become shorter. Consequently, the entire macro lens system can be made shorter, so that further miniaturization can be attained. However, the correcting of spherical aberration and coma occurred in the positive first lens group 10 and the positive second lens group 20 becomes difficult.

If the refractive power of the negative third lens group 30 becomes weaker, i.e., the focal length thereof is made longer, to the extent that f3/f exceeds the lower limit of condition (2), the correcting of residual aberrations, particularly spherical aberration and coma, in the positive first lens group 10 and the positive second lens group 20 becomes difficult. Moreover, if the refractive power of the negative third lens group 30 becomes weaker, the traveling distance of the focusing lens group (the positive first lens group 10 and the positive second lens group 20) becomes longer. However, the negative third lens group 30 is stationary, so that the diameter thereof is inevitably made larger in order to secure peripheral illumination at a closer distance, and the negative third lens group 30 with a larger diameter causes an increase in production costs.

Condition (3) specifies the ratio of the combined focal length of the positive second sub-lens group 12 and the positive second lens group 20 to the focal length of the negative first sub-lens group 11. Namely, in the retro-focus type lens system, condition (3) determines the ratio of the refractive power of the positive lens group to that of the negative lens group.

If $f_{1b-2}/f1a$ exceeds the upper limit of condition (3), the refractive power of the negative first sub-lens group 11 becomes stronger, so that distortion is overcorrected.

If $f_{1b-2}/f1a$ exceeds the lower limit of condition (3), the combined refractive power of the positive second sub-lens group 12 and the positive second lens group 20 becomes stronger, so that the back focal distance can advantageously be secured; however, spherical aberration cannot adequately be corrected.

Specific numerical data of the embodiments will be described hereinafter.

In the diagrams of spherical aberration and the sine condition, SA designates spherical aberration, SC designates the sine condition, FNO. designates the F-number, and FE designates the effective F-number.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the tables, FNO. designates the F-number, f designates the focal length of the entire lens system, W designates the half angle-of-view (°), fB designates the back focal distance, r designates the radius of curvature, d designates the lens-element thickness or a distance between lens elements (lens groups), $N_d$ designates the refractive index of the d-line, and ν designates the Abbe number.

In the embodiments to be discussed below, no aspherical surface is provided on lens elements.

Embodiment 1

FIG. 1 shows the lens arrangement of the first embodiment of the macro lens system according to the present invention, when an object at infinity is in an in-focus state.

FIGS. 2A through 2E show various aberrations occurred in the lens arrangement shown in FIG. 1, when an object at infinity is photographed.

FIGS. 3A through 3E show various aberrations occurred in the lens arrangement shown in FIG. 1, when an object at a closer distance is photographed.

Table 1 shows the numerical data of the first embodiment.

In Tables 1 through 5, the values of d for surface No. 13 (i.e., distance between the positive second lens group 20 and the positive third lens group 30) indicate the distances therebetween at an infinite photographic position; −0.5 magnification photographic position; and −1.0 magnification photographic position, in this order from the left to right in each table.

The negative first lens group 10 (surface Nos. 1 through 7) includes a positive meniscus lens element (positive first lens element) having the convex surface facing toward the object, a negative meniscus lens element (negative second lens element) having the convex surface facing toward the object (and having the image-side concave surface with a smaller radius of curvature), and cemented lens elements having a positive biconvex lens element (positive third lens element) and a negative biconcave lens element (negative fourth lens element), in this order from the object. The positive first lens element and the negative second lens element constitute the negative first sub-lens group 11. The positive third lens element and the negative fourth lens element constitute the second sub-lens group 12.

The positive second lens group 20 (surface Nos. 8 through 13) includes a negative biconcave lens element, a positive meniscus lens element having the convex surface facing toward the image, and a positive biconvex lens element, in this order from the object.

The positive third lens group 30 (surface Nos. 14 through 17) includes a negative meniscus lens element having the concave surface facing toward the image, and a positive biconvex lens element, in this order from the object.

The diaphragm S is provided 4.425 in front of (on the side of the object) the positive second lens group 20 (surface No. 8).

TABLE 1

$F_{NO.} = 1:2.88$
f = 34.41
W = 23.4
fB = 38.72

| Surf. No. | r | d | Nd | ν |
|---|---|---|---|---|
| 1 | 29.593 | 3.20 | 1.80518 | 25.4 |
| 2 | 51.800 | 0.44 | — | — |
| 3 | 26.800 | 1.68 | 1.78590 | 44.2 |
| 4 | 11.117 | 11.89 | — | — |
| 5 | 41.849 | 5.97 | 1.77250 | 49.6 |
| 6 | −14.155 | 1.30 | 1.54814 | 45.8 |
| 7 | 87.954 | 8.43 | — | — |
| 8 | −25.420 | 1.20 | 1.74077 | 27.8 |
| 9 | 63.190 | 1.20 | — | — |
| 10 | −76.294 | 3.12 | 1.62041 | 60.3 |
| 11 | −18.874 | 0.20 | — | — |
| 12 | 46.415 | 3.22 | 1.74100 | 52.7 |
| 13 | −46.415 | 1.00-12.57-24.13 | — | — |
| 14 | −265.321 | 1.20 | 1.77250 | 49.6 |
| 15 | 38.543 | 0.62 | — | — |

TABLE 1-continued $F_{NO.} = 1:2.88$
$f = 34.41$
$W = 23.4$
$fB = 38.72$

| Surf. No. | r | d | Nd | ν |
|---|---|---|---|---|
| 16 | 61.300 | 2.85 | 1.54814 | 45.8 |
| 17 | −61.300 | — | — | — |

Embodiment 2

FIG. 4 shows the lens arrangement of the second embodiment of the macro lens system according to the present invention, when an object at infinity is in an in-focus state.

FIGS. 5A through 5E show various aberrations occurred in the lens arrangement shown in FIG. 4, when an object at infinity is photographed.

FIGS. 6A through 6E show various aberrations occurred in the lens arrangement shown in FIG. 4, when an object at a closer distance is photographed.

Table 2 shows the numerical data of the second embodiment.

The basic lens arrangement of the second embodiment is the same as that of the first embodiment.

The diaphragm S is provided 3.902 in front of (on the side of the object) the positive second lens group 20 (surface No. 8).

TABLE 2

$F_{NO.} = 1:2.88$
$f = 30.90$
$W = 26.0$
$fB = 37.00$

| Surf. No. | r | d | Nd | ν |
|---|---|---|---|---|
| 1 | 33.912 | 2.74 | 1.80518 | 25.4 |
| 2 | 59.633 | 0.26 | — | — |
| 3 | 30.134 | 1.60 | 1.77250 | 49.6 |
| 4 | 11.406 | 12.63 | — | — |
| 5 | 42.900 | 5.49 | 1.72000 | 50.2 |
| 6 | −13.900 | 1.30 | 1.53172 | 48.9 |
| 7 | 1020.662 | 9.35 | — | — |
| 8 | −28.995 | 1.27 | 1.80518 | 25.4 |
| 9 | 52.842 | 1.26 | — | — |
| 10 | −80.026 | 2.96 | 1.69680 | 55.5 |
| 11 | −22.490 | 0.20 | — | — |
| 12 | 50.630 | 3.36 | 1.77250 | 49.6 |
| 13 | −37.780 | 1.00-12.32-23.64 | — | — |
| 14 | 156.000 | 1.20 | 1.72000 | 50.2 |
| 15 | 32.200 | 0.77 | — | — |
| 16 | 51.000 | 2.50 | 1.53172 | 48.9 |
| 17 | −170.400 | — | — | — |

Embodiment 3

FIG. 7 shows the lens arrangement of the third embodiment of the macro lens system according to the present invention, when an object at infinity is in an in-focus state.

FIGS. 8A through 8E show various aberrations occurred in the lens arrangement shown in FIG. 7, when an object at infinity is photographed.

FIGS. 9A through 9E show various aberrations occurred in the lens arrangement shown in FIG. 7, when an object at a closer distance is photographed.

Table 3 shows the numerical data of the third embodiment. The basic lens arrangement of the third embodiment is the same as that of the first embodiment.

The diaphragm S is provided 2.820 in front of (on the side of the object) the positive second lens group 20 (surface No. 8).

TABLE 3

$F_{NO.} = 1:2.88$
$f = 30.90$
$W = 25.9$
$fB = 37.00$

| Surf. No. | r | d | Nd | ν |
|---|---|---|---|---|
| 1 | 38.001 | 3.29 | 1.80518 | 25.4 |
| 2 | 91.981 | 0.10 | — | — |
| 3 | 38.242 | 1.50 | 1.77250 | 49.6 |
| 4 | 12.571 | 15.00 | — | — |
| 5 | 29.830 | 6.39 | 1.77250 | 49.6 |
| 6 | −18.128 | 1.40 | 1.53172 | 48.9 |
| 7 | 71.064 | 5.32 | — | — |
| 8 | −21.452 | 1.94 | 1.74000 | 27.8 |
| 9 | 44.331 | 1.16 | — | — |
| 10 | −216.306 | 3.07 | 1.69680 | 55.5 |
| 11 | −20.697 | 0.30 | — | — |
| 12 | 49.175 | 2.95 | 1.77250 | 49.6 |
| 13 | −48.490 | 1.00-11.86-22.63 | — | — |
| 14 | −127.799 | 1.50 | 1.80440 | 39.6 |
| 15 | 39.069 | 0.98 | — | — |
| 16 | 60.964 | 3.42 | 1.58144 | 40.7 |
| 17 | −45.244 | — | — | — |

Embodiment 4

FIG. 10 shows the lens arrangement of the fourth embodiment of the macro lens system according to the present invention, when an object at infinity is in an in-focus state.

FIGS. 11A through 11E show various aberrations occurred in the lens arrangement shown in FIG. 10, when an object at infinity is photographed.

FIGS. 12A through 12E show various aberrations occurred in the lens arrangement shown in FIG. 10, when an object at a closer distance is photographed.

Table 4 shows the numerical data of the fourth embodiment.

The basic lens arrangement of the fourth embodiment is the same as that of the first embodiment.

The diaphragm S is provided 2.123 in front of (on the side of the object) the positive second lens group 20 (surface No. 8).

TABLE 4

$F_{NO.} = 1:2.88$
$f = 34.43$
$W = 23.4$
$fB = 37.00$

| Surf. No. | r | d | Nd | ν |
|---|---|---|---|---|
| 1 | 29.104 | 2.90 | 1.80518 | 25.4 |
| 2 | 46.173 | 0.26 | — | — |
| 3 | 26.891 | 1.60 | 1.74400 | 44.8 |
| 4 | 11.580 | 13.56 | — | — |
| 5 | 45.822 | 5.27 | 1.77250 | 49.6 |
| 6 | −14.791 | 1.30 | 1.54814 | 45.8 |
| 7 | 295.333 | 8.33 | — | — |
| 8 | −25.168 | 1.20 | 1.74077 | 27.8 |
| 9 | 52.842 | 1.43 | — | — |
| 10 | −61.557 | 2.82 | 1.65160 | 58.5 |
| 11 | −20.881 | 0.21 | — | — |

TABLE 4-continued $F_{NO.} = 1:2.88$
f = 34.43
W = 23.4
fB = 37.00

| Surf. No. | r | d | Nd | ν |
|---|---|---|---|---|
| 12 | 51.980 | 3.35 | 1.74100 | 52.7 |
| 13 | −37.779 | 1.00-13.31-25.63 | — | — |
| 14 | 232.315 | 1.39 | 1.77250 | 49.6 |
| 15 | 34.130 | 0.72 | — | — |
| 16 | 53.207 | 2.58 | 1.54814 | 45.8 |
| 17 | −122.135 | — | — | — |

Embodiment 5

FIG. 13 shows the lens arrangement of the fifth embodiment of the macro lens system according to the present invention, when an object at infinity is in an in-focus state.

FIGS. 14A through 14E show various aberrations occurred in the lens arrangement shown in FIG. 13, when an object at infinity is photographed.

FIGS. 15A through 15E show various aberrations occurred in the lens arrangement shown in FIG. 13, when an object at a closer distance is photographed.

Table 5 shows the numerical data of the fifth embodiment.

The basic lens arrangement of the fifth embodiment is the same as that of the first embodiment.

The diaphragm S is provided 2.831 in front of (on the side of the object) the positive second lens group 20 (surface No. 8).

TABLE 5

$F_{NO.} = 1:2.88$
f = 30.90
W = 25.9
fB = 37.00

| Surf. No. | r | d | Nd | ν |
|---|---|---|---|---|
| 1 | 40.394 | 3.25 | 1.80518 | 25.4 |
| 2 | 91.208 | 0.10 | — | — |
| 3 | 35.023 | 1.50 | 1.77250 | 49.6 |
| 4 | 12.842 | 17.28 | — | — |
| 5 | 29.440 | 4.63 | 1.77250 | 49.6 |
| 6 | −19.024 | 1.40 | 1.53172 | 48.9 |
| 7 | 80.000 | 5.33 | — | — |
| 8 | −21.776 | 1.72 | 1.72825 | 28.5 |
| 9 | 38.951 | 1.21 | — | — |
| 10 | −229.975 | 2.95 | 1.69680 | 55.5 |
| 11 | −21.674 | 0.30 | — | — |
| 12 | 49.762 | 2.91 | 1.77250 | 49.6 |
| 13 | −46.233 | 1.00-11.48-21.97 | — | — |
| 14 | −146.584 | 1.50 | 1.80440 | 39.6 |
| 15 | 39.339 | 0.98 | — | — |
| 16 | 72.376 | 3.25 | 1.58144 | 40.7 |
| 17 | −45.032 | — | — | — |

Embodiment 6

FIG. 16 shows the lens arrangement of the sixth embodiment of the macro lens system according to the present invention, when an object at infinity is in an in-focus state.

FIGS. 17A through 17E show various aberrations occurred in the lens arrangement shown in FIG. 16, when an object at infinity is photographed.

FIGS. 18A through 18E show various aberrations occurred in the lens arrangement shown in FIG. 16, when an object at a closer distance is photographed.

Table 6 shows the numerical data of the sixth embodiment.

The basic lens arrangement of the sixth embodiment is the same as that of the first embodiment.

The diaphragm S is provided 2.609 in front of (on the side of the object) the positive second lens group 20 (surface No. 8).

TABLE 6

$F_{NO.} = 1:2.88$
f = 34.15
W = 23.6
fB = 38.52

| Surf. No. | r | d | Nd | ν |
|---|---|---|---|---|
| 1 | 29.624 | 3.20 | 1.80518 | 25.4 |
| 2 | 51.745 | 0.20 | — | — |
| 3 | 26.745 | 1.64 | 1.78590 | 44.2 |
| 4 | 11.186 | 12.09 | — | — |
| 5 | 41.624 | 5.91 | 1.77250 | 49.6 |
| 6 | −14.298 | 1.30 | 1.54814 | 45.8 |
| 7 | 74.774 | 8.82 | — | — |
| 8 | −24.755 | 1.20 | 1.72260 | 28.1 |
| 9 | 63.110 | 0.91 | — | — |
| 10 | −78.860 | 3.11 | 1.61999 | 60.3 |
| 11 | −18.950 | 0.20 | — | — |
| 12 | 45.226 | 3.27 | 1.74100 | 52.7 |
| 13 | −45.226 | 1.00-12.56-24.1 | — | — |
| 14 | −270.253 | 1.20 | 1.77250 | 49.6 |
| 15 | 38.311 | 0.50 | — | — |
| 16 | 60.870 | 2.85 | 1.54814 | 45.8 |
| 17 | −60.870 | — | — | — |

The numerical values of each condition for each embodiment are shown in Table 7.

TABLE 7

| | Embod. 1 | Embod. 2 | Embod. 3 | Embod. 4 | Embod. 5 | Embod. 6 |
|---|---|---|---|---|---|---|
| Cond. (1) | 0.35 | 0.41 | 0.49 | 0.39 | 0.56 | 0.35 |
| Cond. (2) | −6.33 | −8.15 | −9.48 | −6.87 | −8.13 | −6.40 |
| Cond. (3) | −0.64 | −0.73 | −0.65 | −0.59 | −0.61 | −0.63 |

As can be understood from Table 7, the first through sixth numerical embodiments satisfy conditions (1) through (3). Furthermore, as can be understood from the aberration diagrams, the various aberrations are suitably corrected at an infinite photographic distance and at a close photographic distance.

According to the present invention, a miniaturized macro lens system with the following features can be attained:

(i) miniaturization of the macro lens system is attained by an arrangement in which one lens group (i.e., integrally moved the positive first lens group and the positive second lens group) is arranged to function as a focusing lens group, and the focusing lens group is formed as a retro-focus type lens group;

(ii) the correcting of aberrations, particularly spherical aberrations and distortion, is suitably performed from an infinite distance to a closer distance.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A macro lens system comprises a positive first lens group, a diaphragm, a positive second lens group, and a negative third lens group, in this order from an object, wherein upon focusing from an object at an infinite distance to an object at a closer distance, said positive first lens group and said positive second lens group integrally move toward the object without changing a distance therebetween, with respect to said negative third lens group which is stationary with respect to an imaging plane in a camera body;

wherein said positive first lens group comprises a negative first sub-lens group and a positive second sub-lens group which are divided at a maximum distance between lens elements in said positive first lens group; and wherein said a macro lens system satisfies the following conditions:

$0.32 < d/f < 0.7$ $-10 < f3/f < -6$ wherein d designates an distance between said negative first sub-lens group and said positive second sub-lens group;

f designates a focal length of the entire macro lens system; and f3 designates a focal length of said negative third lens group.

2. The macro lens system according to claim 1, wherein said negative first sub-lens group comprises a plurality of lens elements, wherein said plurality of lens elements comprise a negative lens element;

wherein the rest of said plurality of lens elements are provided on the object-side of said negative lens element; and wherein said rest of said plurality of lens elements comprise at least one positive lens element.

3. The macro lens system according to claim 2, wherein said negative first sub-lens group comprises a positive first lens element having a convex surface facing toward the object and a negative second lens element, in this order from the object.

4. The macro lens system according to claim 3, wherein said negative second lens element comprises a negative meniscus lens element having the concave surface, with a smaller radius of curvature, facing toward the image.

5. The macro lens system according to claim 3, wherein said positive second sub-lens group comprises cemented lens elements having a positive third lens element and a negative fourth lens element, in this order from the object.

6. The macro lens system according to claim 1, further satisfying the following condition:

$-0.75 < f_{1b-2}/f1a < -0.55$ wherein $f_{1b-2}$ designates a combined focal length of said positive second sub-lens group and said positive second lens group; and f1a designates a focal length of said negative first sub-lens group.

7. The macro lens system according to claim 6, wherein said positive second lens group comprises a biconcave negative lens element, and two positive lens elements, in that order from the object.

8. The macro lens system according to claim 7, wherein said positive second lens group comprises a negative biconcave lens element, a positive lens element having a convex surface facing toward the image, and a positive biconvex lens element, in this order from the object.

9. The macro lens system according to claim 1, wherein said negative third lens group comprises a negative lens element and a positive biconvex lens element.

* * * * *